May 21, 1957 R. E. HARVEY 2,793,280
ELECTRICALLY HEATED LIQUID CONNECTION UNIT
Filed Oct. 6, 1954
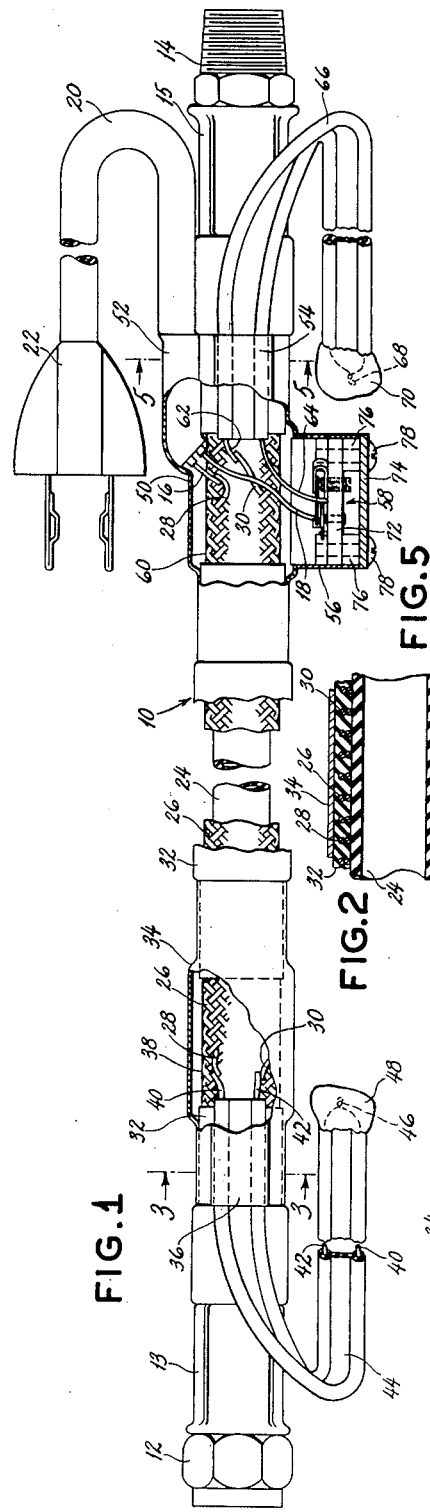
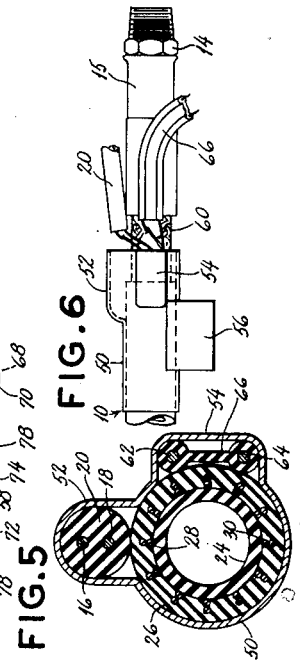
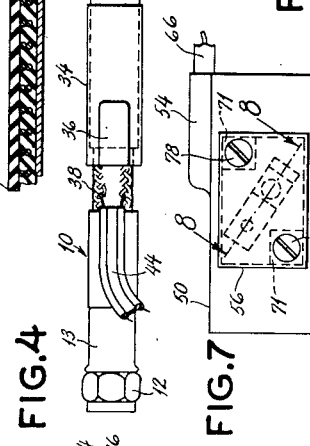
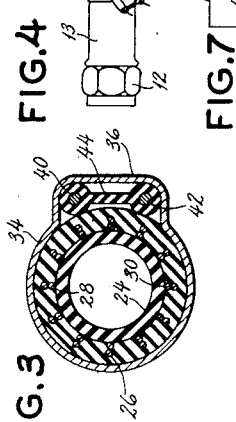
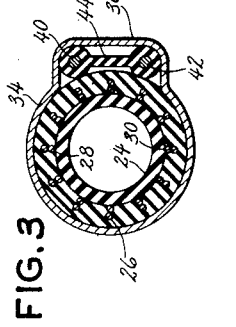
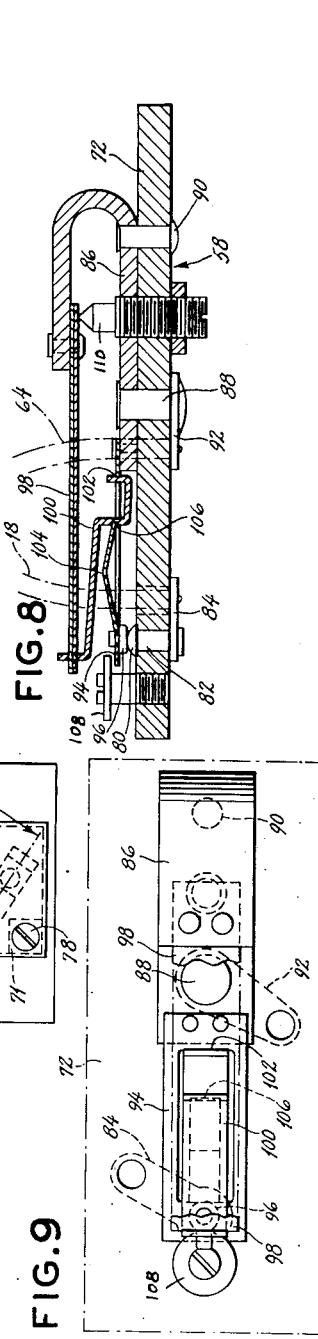
INVENTOR.
RAYMOND E. HARVEY
BY
ATTORNEY United States Patent Office 2,793,280
Patented May 21, 1957

2,793,280

ELECTRICALLY HEATED LIQUID CONNECTION UNIT

Raymond E. Harvey, Plymouth, Conn., assignor to The Waterbury Pressed Metal Company, Waterbury, Conn., a corporation of Connecticut Application October 6, 1954, Serial No. 460,665

10 Claims. (Cl. 219—39)

The invention relates to a unit including a hose for providing a connection from a liquid supply pipe to a liquid discharge or intake pipe. A unit embodying the invention may be used under various conditions and for various liquids, and it is particularly adapted for use when the liquid is adversely affected by low temperatures. The liquid may be water which is subject to freezing or the liquid may be fuel oil or the like which is subject to deleterious increases in viscosity. In accordance with the invention heating is effected to counteract the changes otherwise resulting from low temperature.

As an example, a connection unit embodying the invention may be used for connecting a water supply pipe projecting from the ground to the intake or receiving pipe for the water piping of a house trailer or mobile home. In regions where there may be freezing temperatures, difficulties have been encountered by the freezing of the water not only in the connecting hose but also in the exposed portion of the water supply pipe and in the exposed portion of the water receiving pipe.

The major object of the present invention is to provide a liquid connection unit such as above referred to having electrical heating means constructed and arranged to heat the liquid in the hose and in the exposed portions of the liquid supplying and receiving pipes. The heating means serves to prevent freezing when the liquid is water and it serves to maintain a suitable viscosity when the liquid is fuel oil or the like.

A further object of the invention is to provide a liquid connection unit such as above referred to wherein there is a temperature responsive means for controlling and regulating the heating effected by the heating means.

Other objects of the invention will be apparent from the drawing and from the following description.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing:

Fig. 1 is a side view of a liquid connection unit embodying the invention, certain parts being broken away and the central portion being omitted.

Fig. 2 is an enlarged fragmentary longitudinal sectional view of the hose.

Fig. 3 is an enlarged transverse sectional view taken along the line 3—3 of Fig. 1.

Fig. 4 is a fragmentary view on a reduced scale of the left portion of the liquid connection unit, this view showing certain parts in an intermediate stage of assembly.

Fig. 5 is an enlarged transverse sectional view taken along the line 5—5 of Fig. 1.

Fig. 6 is a fragmentary view on a reduced scale of the right portion of the liquid connection unit, this view showing certain parts in an intermediate stage of assembly.

Fig. 7 is a bottom view on a reduced scale of a portion of the liquid connection unit near the right end.

Fig. 8 is an enlarged vertical sectional view taken along the line 8—8 of Fig. 7.

Fig. 9 is a plan view of some of the parts shown in Fig. 8.

Referring to the drawing and more particularly to Fig. 1 thereof, 10 represents in its entirety a hose particularly adapted for providing a liquid supply connection between a liquid supply pipe and a liquid discharge or intake pipe. The supply pipe may be a pipe for supplying water and the discharge or receiving pipe may be the receiving pipe for the water piping of a house trailer or mobile home. The hose 10 is provided with first and second couplings at the ends thereof. The first coupling 12 is held in place by a ferrule 13 and it is shown as being a standard female coupling connectible with a faucet or other terminal on a supply pipe for water or other liquid. When used for a trailer, the water supply pipe with its faucet may be provided adjacent the trailer location and it ordinarily has a portion immediately adjacent said first coupling and exposed above the ground. The second coupling 14 is held in place by a ferrule 15 and it is shown as being a standard male coupling connectible with the receiving pipe on the trailer. The said receiving pipe ordinarily has a portion immediately adjacent said second coupling and exposed at the outside of the trailer.

Two electrical lead wires 16 and 18 are mechanically connected with the hose and are electrically connectible to a current source. As shown, the wires 16 and 18 are in a cord 20 provided with a standard connection plug 22, the wires being connected with the prongs of the plug. The cord 20 is shown as connected with the hose near the second coupling 14 which is connectible with the said receiving pipe, but as to this the invention is not necessarily limited.

At least one wire of high electrical resistance is connected in circuit with the lead wires 16 and 18 and extends through the major portion of the length of the hose, this wire constituting a heating element and being positioned for heating water or other liquid within the hose.

Preferably the hose 10 and its heating wire or wires are constructed or arranged as shown in detail in Figs. 2 and 3. It comprises an inner tubular liner 24 formed of a suitable non-toxic plastic material, and it comprises a sheath 26 formed of elongated tensile elements braided in place on the liner 24, the sheath enabling the liner to resist internal pressure. The tensile elements of the sheath may advantageously be yarn formed from spun glass, but as to this there may be variation. The braided elements of the sheath include at least one conducting wire 28 and preferably two wires 28 and 30 which have glass or other insulation thereon. The wires 28 and 30 are formed of a metal having a relatively high electrical resistance and they are adapted to serve as heating elements. The wires 28 and 30 are braided in place with the other sheath elements, the said wires 28 and 30 being so located that they extend around the liner in opposite directions. After the elements of the sheath 26 have been braided in place, an outer layer or protective jacket 32 of material such as rubber is applied, as for instance by extrusion.

Mechanically connected with the hose 10 adjacent the first coupling 12 is a first loop of flexible wire of high electrical resistance, this loop being electrically connected with the lead wires 16 and 18 and being adapted to be wrapped around the exposed portion of the liquid supply pipe for heating liquid therein. The preferred construction of the said first loop and of its connecting means will now be described.

Before the first coupling 12 is connected with the hose a first metallic sleeve 34 is placed on the hose as shown in Fig. 4, this sleeve having a diameter slightly greater than that of the jacket 32 of the hose. The sleeve 34 is preferably provided at its outer end portion with a front bulge 36 which extends longitudinally and is open at its left end, the sleeve being thus provided with a wire recess.

The material of the jacket 32 of the hose is removed or stripped at an area 38 adjacent the left end of the hose and suitably spaced therefrom, a portion of the sheath 26 being thus exposed. As shown, the area 38 extends entirely around the sheath, but a smaller area is ordinarily sufficient. Two insulated flexible wires 40 and 42 are provided which are connected with each other to constitute the before-mentioned first loop. The said wires 40 and 42 are formed of a metal having a relatively high resistance so that the wires serve as heating elements. The two wires 40 and 42 may conveniently be the two wires of a conventional heating strip 44, the insulating material of the strip holding the two wires in uniformly spaced relationship.

Within the stripped area 38 of the hose, portions of the before-mentioned conducting wires 28 and 30 are pulled from the braided sheath and the insulation is removed to expose the metal. The said wires 28 and 30 are soldered or otherwise connected to the respective wires 40 and 42, the soldered joints being covered by suitable insulation. The opposite ends of the wires 40 and 42 are bared and are connected with each other as indicated at 46, the connection being enclosed by a body or seal 48 formed of insulating material. From the foregoing description it will be apparent that the heating wires 40 and 42 are connected with the lead wires 16 and 18 by means of the hose heating wires 28 and 30, the said wires 40 and 42 being connected in series with each other and in series with the wires 28 and 30.

When the wires 40 and 42 of the heating strip 44 have been connected as described, the sleeve 34 is moved toward the left from the position shown in Fig. 4 to the position shown in Fig. 1, the bulge or wire recess 36 fitting around the strip 44. Then by means of suitable tools the end portions of the sleeve 34 are pressed so as to reduce the sleeve diameter at its end portions. Thus the sleeve is firmly clamped to the hose, the sleeve serving to cover the stripped area 38 and also to cover the connections between the wires. The wires 40 and 42 of said strip 44 extend through said wire recess 36 in the sleeve.

Mechanically connected with the hose 10 adjacent the second coupling 14 is a second loop of flexible wire of high electrical resistance, this loop being electrically connected with the lead wires 16 and 18 and being adapted to be wrapped around the exposed portion of the liquid receiving pipe for heating liquid therein. The preferred construction of the said second loop and of its connecting means will now be described.

Before the second coupling 14 is connected with the hose a second metallic sleeve 50 is placed on the hose as shown in Fig. 7, this sleeve having a diameter slightly greater than that of the jacket 32 of the hose. The sleeve 50 is preferably provided at its outer end portion with a top bulge 52 and also with a front bulge 54, these bulges extending longitudinally and being open at their right ends. The bulge 54 provides a wire recess in said sleeve. A thermostat is preferably provided, and when there is a thermostat the sleeve 50 has a bottom opening which is preferably rectangular. A rectangular sheet metal housing 56 is provided which is connected with the sleeve 50 by soldering or otherwise and which fits the said opening therein. Located within the housing 56 is a thermostat 58 which will be hereinafter described in detail.

The material of the jacket 32 of the hose is removed or stripped at an area 60 adjacent the left end of the hose and suitably spaced therefrom, a portion of the sheath 26 being thus exposed. As shown, the area 60 extends entirely around the sheath, but a smaller area is ordinarily sufficient. Two insulated flexible wires 62 and 64 are provided which are connected with each other to constitute the before-mentioned second loop. The said wires 62 and 64 are similar to the wires 40 and 42 and they are formed of a metal having a relatively high resistance so that the wires serve as heating elements. The two wires 62 and 64 may conveniently be the two wires of a conventional heating strip 66 similar to the before-described strip 44. The opposite ends of the wires 62 and 64 are bared and are connected with each other as indicated at 68, the connection being enclosed by a body or seal 70 formed of insulating material.

Within the stripped area 60 of the hose, portions of the before-mentioned conducting wires 28 and 30 are pulled from the braided sheath and the insulation is removed to expose the metal. The said wires 28 and 30 are soldered or otherwise connected, one to one wire of the cord 20 and the other to one wire of the strip 66. As shown, it may be assumed that the wire 28 is connected with the wire 16 of the cord and that the wire 30 is connected with the wire 62 of the strip. The remaining wire 18 of the cord and the remaining wire 64 of the strip are adapted for subsequent connection with the thermostat 58 which serves under certain conditions as hereinafter explained to provide an electrical connection between the last said wires. From the foregoing description it will be apparent that, when the thermostat is in place and connected, the wires 62 and 64 are connected with the lead wires 18 and 20. The electrical connections for the several wires may be varied, but as shown all of the wires are connected in series. The wires are connected in the following sequence: wire 16, wire 28, wire 40, wire 42, wire 30, wire 62, wire 64, thermostat 58, and wire 18.

When the wires 16 and 18 of the cord 20 have been connected as described and when the wires 62 and 64 of the heating strip 66 have been connected as described, the sleeve 50 is moved toward the right from the position shown in Fig. 6 to the position shown in Fig. 1, the bulge 52 fitting around the cord 20 and the bulge or wire recess 54 fitting around the strip 66. Then by means of suitable tools, the end portions of the sleeve 50 are pressed so as to reduce the sleeve diameter at its end portions. Thus the sleeve is firmly clamped to the hose, the sleeve serving to cover the stripped portion 60 and also to cover the connections between the wires. The wires 62 and 64 of the strip 66 extend through said wire recess 54 in the sleeve.

From the foregoing detailed description it will be observed that a liquid connection unit embodying the invention comprises a length of hose 10, together with first and second couplings 12 and 14 at the respective ends of the hose, one of said couplings being adapted to connect the hose with a liquid supply pipe and the other of said couplings being adapted to connect the hose with a liquid receiving pipe. The said unit also comprises two high resistance heating wires 28 and 30 extending throughout the major portion of the length of the hose 10 and positioned for heating liquid therein, together with a first pair of flexible high resistance heating wires 40 and 42 mechanically connected with the hose 10 adjacent the said first coupling 12 and electrically connected with the immediately adjacent portions of the first said heating wires 28 and 30, the flexible heating wires 40 and 42 of said first pair being adapted to be wrapped around the immediately adjacent exposed portion of a pipe connected with said first coupling 12 for heating liquid in the last said pipe. The unit also comprises a second pair of flexible high resistance heating wires 62 and 64 mechanically connected with the hose 10 adjacent the said second coupling 14 and electrically connected with the immediately adjacent portion of at least one of the first said heating wires 28 and 30, the flexible heating wires 62 and 64 of said second pair being adapted to be wrapped around the immediately adjacent exposed portion of a pipe connected with said second coupling 14 for heating liquid in the last said pipe. The said unit further comprises means such as the wires 16 and 18 connectible with a current source for establishing an electrical circuit through all of said heating wires 28, 30 and 40, 42 and 62, 64. As shown, the wires 40, 42 and 62, 64 are initially separate from the wires 28, 30 and are connected therewith by soldering or otherwise, but the invention is not so limited. Preferably the flexible heating wires 40, 42 and 62, 64 of said pairs are mechanically connected with the hose 10 at positions longitudinally spaced from the respective couplings 12 and 14 and said flexible heating wires are electrically connected with the first said heating wires 28 and 30 at said longitudinally spaced positions.

Some of the details of the thermostat 58 as shown do not constitute any part of the present invention, but the invention does relate in part to the thermostat in its novel relationship with other parts.

The chamber within the housing 56 is bounded in part by a portion of the hose 10. The housing 56 is preferably at the stripped area 60, so that the chamber therein is bounded by the exposed sheath of the hose. The temperature within the housing is therefore controlled in part by the temperature of liquid within the hose. Within the housing chamber is a switch electrically connected to close and open the circuit through the heating wires for the hose. Also within the housing chamber is a thermally responsive means for opening and closing the switch in accordance with increases and decreases in the temperature within the housing chamber.

The housing 56 is provided with two ears 71, 71 held in place by soldering or otherwise and having threaded holes therein. A plate 72 of insulating material is adapted to engage the ears 71, 71, this plate at the upper face thereof carrying the said thermostat 58. A bottom cover plate 74 is provided for the housing 56 and spacing washers 76, 76 are provided between the plates 72 and 74. When the wires 18 and 64 have been connected with the thermostat, the plates 72 and 74 are put in place with the washers 76, 76 between them and the plates are held by screws 78, 78 entering the threaded holes in the ears 71, 71. Preferably the thermostat is put in place and connected after the sleeve 50 has been clamped to the hose.

Secured to the plate 72 at the top thereof is a stationary contact 80 forming part of a pin 82 extending through the plate. The pin 82 is electrically connected with a short conductor 84 at the bottom of the plate. The conductor 84 is connected by soldering or otherwise with the said wire 18 which extends through a hole in the plate 72. Connected with the plate 72 at the top thereof is a U-shaped conductor 86, this being held in place by rivets 88 and 90. Preferably to conserve space, the conductor 86 and other parts of the thermostat extend diagonally on the plate 72 as indicated in Fig. 7. The rivet 88 is electrically connected with a short conductor 92 at the bottom of the plate. The conductor 92 is connected by soldering or otherwise with the said wire 64 which extends through a hole in the plate 72. Connected with the lower leg of the conductor 86 is a strip 94 formed of resilient conducting material. The strip 94 extends generally horizontally from the conductor 86 and carries an upper contact 96 engageable with the stationary contact 80. The contacts 80 and 96 and the parts associated therewith constitute the before-mentioned switch.

Connected with the upper leg of the conductor 86 is a bi-metallic strip 98, this strip extending horizontally and being above the contact carrying strip 94. A toggle member 100 is connected at its upper outer end portion with the bi-metallic strip 98. The lower inner end portion of the member 100 extends into an opening in the resilient strip 94, the said member being pivotally movable about a transverse axis at 102 when the bi-metallic strip is flexed. An upwardly bowed portion 104 of the strip 94 engages the toggle member 100 at a transverse axis 106. As shown, the ambient temperature is such that the bi-metallic strip maintains the axis 106 slightly above the main body of the strip 94 and the bowed portion 104 has therefore moved the outer end of the strip 94 downwardly so that the movable contact 96 engages the stationary contact 80. With the contacts engaged a circuit is maintained between the wires 18 and 64. When the temperature within the housing chamber is increased, the bi-metallic strip flexes downwardly, thus moving the axis 106 downwardly. When the last said axis is below the main body of the strip 94, the bowed portion 104 moves the outer end of the strip 94 upwardly with a snap action to separate the contact 96 from the contact 80. Upward movement is limited by the head of a stop screw 108. When the temperature within the housing chamber is later reduced, the parts are restored to the positions shown. Action of the bi-metallic strip 98 may be adjusted by a screw 110 which flexes the U-shaped conductor 86. The bi-metallic strip 98 and the parts associated therewith constitute the before-mentioned thermally responsive means for operating the switch.

When the unit is a water connection for a trailer, the coupling 12 is connected with a faucet or other terminal on a water supply pipe ordinarily having an exposed portion above the ground, and the coupling 14 is connected with a water receiving pipe ordinarily having an exposed portion outside of the trailer. The heating strip 44 which includes the wires 40 and 42 is wrapped around the exposed portion of the water supply pipe and around the faucet. The heating strip 66 which includes the wires 62 and 64 is wrapped around the exposed portion of the water receiving pipe on the trailer. Ordinarily the strip 44 is considerably longer than the strip 66 in order to provide for a relatively long exposed portion of the water supply pipe. The electrical plug 22 is connected with a suitable electrical socket which may be on the trailer.

With an electrical circuit established, the wires 28 and 30 serve to heat or warm the water in the hose 10 sufficiently to prevent freezing, the wires 40 and 42 serve to heat or warm the water in the exposed portion of the water supply pipe sufficiently to prevent freezing, and the wires 62 and 64 heat or warm the water in the exposed portion of the water receiving pipe sufficiently to prevent freezing.

The thermostat 58, when provided as is preferred, serves to control the heating or warming action so that the water is maintained at a temperature only a few degrees above the freezing temperature. The thermostat is in the chamber of the housing 56 which chamber is bounded at one side by a portion of the hose 10. The thermally responsive element 98 of the thermostat is therefore affected to a substantial extent by the temperature of the water within the hose. By means of the screw 110, the thermostat can be calibrated for maintaining any desired temperature within a limited range.

The invention claimed is:

1. A liquid connection unit comprising a length of hose, first and second couplings at the respective ends of the hose, one of said couplings being adapted to connect the hose with a liquid supply pipe and the other of said couplings being adapted to connect the hose with a liquid receiving pipe, two high resistance heating wires extending throughout the major portion of the length of the hose and positioned for heating liquid therein, a first pair of flexible high resistance heating wires mechanically connected with the hose adjacent the said first coupling and electrically connected with the immediately adjacent portions of the first said heating wires, the flexible heating wires of said first pair being adapted to be wrapped around the immediately adjacent exposed portion of a pipe connected with said first coupling for heating liquid in the last said pipe, a second pair of flexible high resistance heating wires mechanically connected with the hose adjacent the said second coupling and electrically connected with the immediately adjacent portion of at least one of the first said heating wires, the flexible heating wires of said second pair being adapted to be wrapped around the immediately adjacent exposed portion of a pipe connected with said second coupling for heating liquid in the last said pipe, and means connectible with a current source for establishing an electrical circuit through all of said heating wires.

2. A liquid connection unit comprising a length of hose, first and second couplings at the respective ends of the hose, one of said couplings being adapted to connect the hose with a liquid supply pipe and the other of said couplings being adapted to connect the hose with a liquid receiving pipe, two high resistance heating wires extending throughout the major portion of the length of the hose and positioned for heating liquid therein, a first pair of flexible high resistance heating wires mechanically connected with the hose at a position adjacent but longitudinally spaced from the said first coupling and electrically connected at said position with the immediately adjacent portions of the first said heating wires, the flexible heating wires of said first pair being adapted to be wrapped around the immediately adjacent exposed portion of a pipe connected with said first coupling for heating liquid in the last said pipe, a second pair of flexible high resistance heating wires mechanically connected with the hose at a position adjacent but longitudinally spaced from the said second coupling and electrically connected at the last said position with the immediately adjacent portion of at least one of the first said heating wires, the flexible heating wires of said second pair being adapted to be wrapped around the immediately adjacent exposed portion of a pipe connected with said second coupling for heating liquid in the last said pipe, and means connectible with a current source for establishing an electrical circuit through all of said heating wires.

3. A liquid connection unit comprising a length of hose, first and second couplings at the respective ends of the hose, the said couplings being adapted respectively to connect the hose with an immediately adjacent liquid supply pipe and with an immediately adjacent liquid receiving pipe, two electrical lead wires mechanically connected with the hose and electrically connectible to a current source, two high resistance heating wires electrically connected in series with the lead wires and extending throughout the major portion of the length of the hose and positioned for heating liquid within the hose, a first loop of flexible high resistance heating wire mechanically connected with the hose adjacent the said first coupling and having its ends electrically connected respectively with the first said heating wires so that the loop is in series with the said heating wires, the said first loop being adapted to be wrapped around the immediately adjacent exposed portion of a liquid supply pipe connected with said first coupling for heating liquid in said supply pipe, and a second loop of flexible high resistance heating wire mechanically connected with the hose adjacent the said second coupling and electrically connected in circuit with the lead wires, the said second loop being adapted to be wrapped around the immediately adjacent exposed portion of a liquid receiving pipe connected with said second coupling for heating liquid in said receiving pipe.

4. A liquid connection unit comprising a length of hose, first and second couplings at the respective ends of the hose, the said couplings being adapted respectively to connect the hose with an immediately adjacent liquid supply pipe and with an immediately adjacent liquid receiving pipe, two electrical lead wires mechanically connected with the hose and electrically connectible to a current source, two high resistance heating wires electrically connected in series with the lead wires and extending throughout the major portion of the length of the hose and positioned for heating liquid within the hose, a first loop of flexible high resistance heating wire mechanically connected with the hose adjacent the said first coupling and having its ends electrically connected respectively with the first said heating wires so that the loop is in series with the said heating wires, the said first loop being adapted to be wrapped around the immediately adjacent exposed portion of a liquid supply pipe connected with said first coupling for heating liquid in said supply pipe, and a second loop of flexible high resistance heating wire mechanically connected with the hose adjacent the said second coupling and having its ends electrically connected respectively with one lead wire and with one of the first said heating wires so that the said lead wires and the first said heating wires and the first loop and the second loop are all connected in a single series, the said second loop being adapted to be wrapped around the immediately adjacent exposed portion of a liquid receiving pipe connected with said second coupling for heating liquid in said receiving pipe.

5. A liquid connection unit comprising a length of hose including a liner and a sheath surrounding the liner and a jacket surrounding the sheath, small portions of the jacket being cut away adjacent the ends of said hose to expose portions of said sheath, first and second couplings at the respective ends of the hose, the said couplings being adapted respectively to connect the hose with an immediately adjacent liquid supply pipe and with an immediately adjacent liquid receiving pipe, first and second sleeves on the hose respectively adjacent said first and second couplings and respectively covering said exposed portions of said sheath, each of which sleeves having a wire recess therein, two electrical lead wires mechanically connected with the hose and electrically connectible with a current source, two high resistance heating wires electrically connected in series with the lead wires and extending throughout the major portion of the length of the hose within said jacket and positioned for heating liquid within the hose, a first loop of flexible high resistance heating wire extending through the wire recess in said first sleeve and having its ends electrically connected respectively with the first said heating wires so that the loop is in series with the said heating wires, the said first loop being adapted to be wrapped around the immediately adjacent exposed portion of a liquid supply pipe connected with said first coupling for heating liquid in said supply pipe, and a second loop of flexible high resistance heating wire extending through the wire recess in said second sleeve and electrically connected in circuit with the lead wires, the said second loop being adapted to be wrapped around the immediately adjacent exposed portion of a liquid receiving pipe connected with said second coupling for heating liquid in said receiving pipe.

6. A liquid connection unit comprising a length of hose comprising a liner and a sheath surrounding the liner and a jacket surrounding the sheath, a small portion of the jacket being cut away to expose a portion of the sheath, first and second couplings at the respective ends of the hose, the said couplings being adapted respectively to connect the hose with an immediately adjacent liquid supply pipe and with an immediately adjacent liquid receiving pipe, two electrical lead wires mechanically connected with the hose and electrically connectible with a current source, at least one high resistance heating wire electrically connected in circuit with the lead wires and extending throughout the major portion of the length of the hose within said jacket and positioned for heating liquid within the hose, a housing connected with the hose and having an interior chamber bounded at one side by the said exposed portion of the sheath of the hose, a switch within the said chamber electrically connected to close and open the circuit through the said heating wire, and a thermally responsive means within the said chamber for opening and closing the said switch in accordance with increases and decreases in the temperature within the chamber.

7. A liquid connection unit comprising a length of hose, first and second couplings at the respective ends of the hose, the said couplings being adapted respectively to connect the hose with an immediately adjacent liquid supply pipe and with an immediately adjacent liquid receiving pipe, two electrical lead wires mechanically connected with the hose and electrically connectible to a current source, at least one high resistance heating wire electrically connected in circuit with the lead wires and extending throughout the major portion of the length of the hose and positioned for heating water within the hose, a switch connected to close and open the circuit through the said heating wire, a thermally responsive means for opening and closing the switch in accordance with increases and decreases in temperature, a first loop of flexible high resistance heating wire mechanically connected with the hose adjacent the said first coupling and having its ends electrically connected respectively with the first said heating wires which first loop is adapted to be wrapped around the immediately adjacent exposed portion of a liquid supply pipe connected with said first coupling for heating liquid in said supply pipe, and a second loop of flexible high resistance heating wire mechanically connected with the hose adjacent the said second coupling and electrically connected in circuit with the lead wires which second loop is adapted to be wrapped around the immediately adjacent exposed portion of a liquid receiving pipe connected with said second coupling for heating liquid in said receiving pipe.

8. A liquid connection unit comprising a length of hose comprising a liner and a sheath surrounding the liner and a jacket surrounding the sheath, a small portion of the jacket being cut away to expose a portion of the sheath, first and second couplings at the respective ends of the hose, the said coupling being adapted respectively to connect the hose with an immediately adjacent liquid supply pipe and with an immediately adjacent liquid receiving pipe, two electrical lead wires mechanically connected with the hose and electrically connectible with a current source, at least one high resistance heating wire electrically connected in circuit with the lead wires and extending throughout the major portion of the length of the hose and positioned for heating liquid within the hose, a housing connected with the hose and having an interior chamber bounded at one side by the said exposed portion of the sheath of the hose, a switch within the said chamber electrically connected to close and open the circuit through the said heating wire, a thermally responsive means within the said chamber for opening and closing the said switch in accordance with increases and decreases in the temperature within the chamber, a first loop of flexible high resistance heating wire mechanically connected with the hose adjacent the said first coupling and electrically connected in circuit with the lead wires which first loop is adapted to be wrapped around the immediately adjacent exposed portion of a liquid supply pipe connected with said first coupling for heating liquid in said liquid supply pipe, and a second loop of flexible high resistance heating wire mechanically connected with the hose adjacent the said second coupling and electrically connected in circuit with the lead wires which second loop is adapted to be wrapped around the immediately adjacent exposed portion of a liquid receiving pipe connected with said second coupling for heating liquid in said receiving pipe.

9. A liquid connection unit comprising a length of hose, first and second couplings at the respective ends of the hose, the said couplings being adapted respectively to connect the hose with an immediately adjacent liquid supply pipe and with an immediately adjacent liquid receiving pipe, two electrical lead wires mechanically connected with the hose and electrically connectible to a current source, two high resistance heating wires electrically connected in series with the lead wires and extending throughout the major portion of the length of the hose and positioned for heating liquid within the hose, a first loop of flexible high resistance heating wire mechanically connected with the hose adjacent the said first coupling and having its ends electrically connected respectively with the first said heating wires so that the loop is in series with the said heating wires, the said first loop being adapted to be wrapped around the immediately adjacent exposed portion of a liquid supply pipe connected with said first coupling for heating liquid in said supply pipe, a second loop of flexible high resistance heating wire mechanically connected with the hose adjacent the said second coupling and electrically connected respectively with first said wires, the said second loop being adapted to be wrapped around the immediately adjacent exposed portion of a liquid receiving pipe connected with said second coupling for heating liquid in said receiving pipe, a switch connected in series with the said wires for closing and opening the circuit through them, and a thermally responsive means for opening and closing the switch in accordance with increases and decreases in temperature.

10. A liquid connection unit comprising a length of hose including a liner and a sheath surrounding the liner and a jacket surrounding the sheath, small portions of the jacket being cut away adjacent the ends of said hose to expose portions of said sheath, first and second couplings at the respective ends of the hose, the said couplings being adapted respectively to connect the hose with an immediately adjacent liquid supply pipe and with an immediately adjacent liquid receiving pipe, first and second sleeves on the hose respectively adjacent said first and second couplings and respectively covering said exposed portions of said sheath, each of which sleeves having a wire recess therein and one of said sleeves having a bulge therein additional to said recess and constituting a housing with an interior chamber bounded in part by an exposed portion of said sheath, two electrical lead wires mechanically connected with the hose and electrically connectible with a current source, two high resistance heating wires electrically connected in series with the lead wires and extending throughout the major portion of the length of the hose within said jacket and positioned for heating liquid within the hose, a switch within the said chamber electrically connected to close and open the circuit through the said heating wires, a thermally responsive means within the said chamber for opening and closing the said switch in accordance with increases and decreases in the temperature within the chamber, a first loop of flexible high resistance heating wire extending through the wire recess in said first sleeve and having its ends electrically connected respectively with the first said heating wires so that the loop is in series with the said heating wires, the said first loop being adapted to be wrapped around the immediately adjacent exposed portion of a liquid supply pipe connected with said first coupling for heating liquid in said supply pipe, and a second loop of flexible high resistance heating wire extending through the wire recess in said second sleeve and electrically connected in circuit with the lead wires, the said second loop being adapted to be wrapped around the immediately adjacent exposed portion of a liquid receiving pipe connected with said second coupling for heating liquid in said receiving pipe.

References Cited in the file of this patent

UNITED STATES PATENTS

| Number | Name | Date |
|---|---|---|
| 1,809,714 | Matthews | June 9, 1931 |
| 1,936,391 | Harrower | Nov. 21, 1933 |
| 1,995,302 | Goldstein | Mar. 26, 1935 |
| 2,288,248 | Long | June 30, 1942 |
| 2,479,355 | Hemker | Aug. 16, 1949 |